US012040174B2

(12) United States Patent
Kovtoun

(10) Patent No.: US 12,040,174 B2
(45) Date of Patent: Jul. 16, 2024

(54) SYSTEMS AND METHODS OF OPERATION OF LINEAR ION TRAPS IN DUAL BALANCED AC/UNBALANCED RF MODE FOR 2D MASS SPECTROMETRY

(71) Applicant: Thermo Finnigan LLC, San Jose, CA (US)

(72) Inventor: Viatcheslav V. Kovtoun, Boise, ID (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 18/308,265

(22) Filed: Apr. 27, 2023

(65) Prior Publication Data

US 2023/0260776 A1 Aug. 17, 2023

Related U.S. Application Data

(62) Division of application No. 17/229,615, filed on Apr. 13, 2021, now Pat. No. 11,651,948, which is a (Continued)

(51) Int. Cl.
*H01J 49/42* (2006.01)
*H01J 49/00* (2006.01)
*H01J 49/02* (2006.01)

(52) U.S. Cl.
CPC ...... *H01J 49/4225* (2013.01); *H01J 49/0031* (2013.01); *H01J 49/022* (2013.01)

(58) Field of Classification Search
CPC .......... H01J 49/00; H01J 49/02; H01J 49/022; H01J 49/4225; H01J 49/0031;
(Continued)

(56) References Cited

U.S. PATENT DOCUMENTS 4,749,860 A * 6/1988 Kelley .................. H01J 49/424 250/282
5,420,425 A 5/1995 Bier et al.
(Continued)

FOREIGN PATENT DOCUMENTS

CN 107437491 A 12/2017
EP 3249680 A1 11/2017
WO WO-2014208336 A1 12/2014

OTHER PUBLICATIONS

Li, et al., "Design and Performance Evaluation of a Linear Ion TrapMass Analyzer Featuring Half Round Rod Electrodes", J. Am. Soc. Mass Spectrom., (2015) 26, pp. 734-740.
(Continued)

*Primary Examiner* — Jason L McCormack

(57) ABSTRACT

A mass selective ion trapping device includes a linear ion trap and a RF control circuitry. The ion trap includes a plurality of trap electrodes configured for generating a quadrupolar trapping field in a trap interior and for mass selective ejection of ions from the trap interior. The RF control circuitry is configured to apply a balanced AC voltage to the trap electrodes during a first period of time such that an AC voltage applied to a first pair of trap electrodes is of the same magnitude and of opposite sign to an AC voltage applied to a second pair of trap electrodes; apply unbalanced RF voltage to the second pair of trap electrodes during a second period of time; ramp the balanced AC voltage down and the unbalanced RF voltage up during a transition period; and eject ions from the linear ion trap after the second period of time.

8 Claims, 17 Drawing Sheets

Related U.S. Application Data division of application No. 16/552,614, filed on Aug. 27, 2019, now Pat. No. 11,004,672.

(58) Field of Classification Search
CPC .... H01J 49/423; H01J 49/426; H01J 49/4265; H01J 49/0027; H01J 49/06; H01J 49/062; H01J 49/063
USPC ......................... 250/281, 282, 283, 290, 293
See application file for complete search history.

(56) References Cited

U.S. PATENT DOCUMENTS

| | | | | |
|---|---|---|---|---|
| 5,714,755 | A | 2/1998 | Wells et al. | |
| 5,747,801 | A | 5/1998 | Quarmby et al. | |
| 7,034,293 | B2 | 4/2006 | Wells | |
| 7,872,228 | B1 | 1/2011 | Kim et al. | |
| 9,076,640 | B2 | 7/2015 | Langridge et al. | |
| 9,865,446 | B2 | 1/2018 | Kovtoun | |
| 2007/0158545 | A1 | 7/2007 | Verentchikov | |
| 2008/0121795 | A1 | 5/2008 | Sugiyama et al. | |
| 2011/0049358 | A1 | 3/2011 | Green et al. | |
| 2015/0060658 | A1 | 3/2015 | Langridge et al. | |
| 2015/0380232 | A1 | 12/2015 | Brown et al. | |
| 2016/0118238 | A1 | 4/2016 | Gordon et al. | |
| 2017/0110311 | A1* | 4/2017 | Reilly | H01J 49/429 |
| 2017/0221694 | A1* | 8/2017 | Papanastasiou | H01J 49/005 |
| 2018/0151339 | A1* | 5/2018 | Wildgoose | G01N 27/62 |

OTHER PUBLICATIONS

Lu et al., "Reducing mass peak instability caused by the phase changes of RF and AC signals in a rectilinear ion-trap analyzer", Rev. Sci. Instrum., 88, 034103 (2017).

Schwartz JC., et al., "A Two-Dimensional Quadrupole Ion Trap Mass Spectrometer", Journal of the American Society for Mass Spectrometry, Elsevier Science Inc, vol. 13, No. 6, Jun. 1, 2002 (Jun. 1, 2002), pp. 659-669, XP055530388, US ISSN: 1044-0305, DOI: 10.1016/S1044-0305(02)00384-7.

Snyder, et al., "Ion Isolation in a Linear Ion Trap Using Dual Resonance Frequencies", Journal of The American Society for Mass Spectrometry, 2016, vol. 27 (12), pp. 1906-1913.

* cited by examiner

End of AC-RF transition event, start of cooling final

End of AC-RF transition event, start of cooling final

End of AC-RF transition event, start of cooling final

End of AC-RF transition event, start of cooling final

End of AC-RF transition event, start of cooling final

End of AC-RF transition event, start of cooling final 400 amu, f1=0.16 MHz 400 amu, f1=0.30 MHz

SYSTEMS AND METHODS OF OPERATION OF LINEAR ION TRAPS IN DUAL BALANCED AC/UNBALANCED RF MODE FOR 2D MASS SPECTROMETRY

CROSS-REFERENCE TO RELATED APPLICATION

This application is a divisional under 35 U.S.C. § 121 of U.S. patent application Ser. No. 17/229,615, filed Apr. 13, 2021. U.S. patent application is a divisional under 35 U.S.C. § 121 and claims the priority benefit of Ser. No. 16/552,614, filed Aug. 27, 2019, now U.S. Pat. No. 11,004,672, issued on May 11, 2021. The disclosure of the foregoing application is incorporated herein by reference.

FIELD

The present disclosure generally relates to the field of mass spectrometry including system and method of operation of linear ion traps in dual balanced AC/unbalanced RF mode for 2D mass spectrometry.

INTRODUCTION

An ion trap as an analytical instrument can provide invaluable opportunities for use in data-independent analysis (DIA) due to its ability to maintain good ions' m/z separation during scan-out under large ion loads in the ion trap. This can open opportunities for extended functionality for the ion trap, especially for a linear ion trap, beyond the routine analytical scan. This functionality can include post-ejection trapping, CID fragmentation and final mass analysis of fragments with a second mass analyzer. Key factors can include ensuring highly efficient trapping of injected ions and maintaining tight control of the kinetic energy of ejected ions. However, the optimal conditions for trapping injected ions may not correspond to the optimal conditions to maintain tight control over the kinetic energy of ejection ions. From the foregoing it will be appreciated that a need exists for improved operation of linear ion traps.

SUMMARY

In a first aspect, a mass selective ion trapping device can include a linear ion trap and an RF control circuitry. The linear ion trap can include a plurality of trap electrodes spaced apart from each other and surrounding a trap interior. The plurality of trap electrodes can include a first pair of trap electrodes and a second pair of trap electrodes. At least a first trap electrode of the first pair of trap electrodes can include a trap exit aperture. The trap electrodes can be configured for generating a quadrupolar trapping field in the trap interior and for mass selective ejection of ions from the trap interior. The RF control circuitry can be configured to apply a balanced AC voltage to the trap electrodes during a first period of time such that a first AC voltage applied to the first pair of trap electrodes is of opposite sign and of substantially the same magnitude to a second AC voltage to the second pair of trap electrodes; apply unbalanced RF voltage to the second pair of trap electrodes during a second period of time; ramp the balanced AC voltage down and the unbalanced RF voltage up during a transition period between the first period of time and the second period of time; and eject ions from the linear ion trap after the second period of time.

In various embodiments of the first aspect, the ions can enter the trap during the first period of time.

In various embodiments of the first aspect, a kinetic energy spread of ions before ejection from the linear ion trap can be less than about 5.0 eV, such as less than about 2.5 eV, such as less than about 0.5 eV, even less than about 0.2 eV.

In various embodiments of the first aspect, an electric field on a centerline of the linear ion trap can be near zero during the first period of time.

In various embodiments of the first aspect, the AC voltage can be in a frequency range of between about 100 kHz and about 600 kHz.

In various embodiments of the first aspect, the AC voltage can be less than about 400 $V_{0\text{-}P}$, such as less than about 200 $V_{0\text{-}P}$.

In various embodiments of the first aspect, the RF voltage can be in a frequency range of between about 750 kHz and about 1500 kHz.

In various embodiments of the first aspect, during the transition period, a ramp down time for the AC voltage can be less than about 1.5 ms and a ramp up time for the RF voltage can be between about 0.8 ms and about 2.5 ms.

In a second aspect, a method for identifying components of a sample can include supplying ions to a mass selective linear ion trap, the ion trap including a plurality of trap electrodes spaced apart from each other and surrounding a trap interior, the trap electrodes configured for generating a quadrupolar trapping field in the trap interior; trapping the ions within a balanced trapping field; transitioning between a balanced trapping field to an unbalanced trapping field; and maintaining the unbalanced trapping field while selectively ejecting ions from the trap interior based on their mass using an auxiliary RF voltage.

In various embodiments of the second aspect, a kinetic energy spread of ions before ejection from the linear ion trap can be less than about 5.0 eV, such as less than about 2.5 eV, such as less than about 0.5 eV, even less than about 0.2 eV.

In various embodiments of the second aspect, an electric field on a centerline of the linear ion trap can be near zero when trapping the ions within the balanced trapping field.

In various embodiments of the second aspect, the balanced trapping field can be generated using an AC voltage in a frequency range of between about 100 kHz and about 600 kHz.

In various embodiments of the second aspect, the balanced trapping field can be generated using an AC voltage of less than about 400 $V_{0\text{-}P}$, such as less than about 200 $V_{0\text{-}P}$.

In various embodiments of the second aspect, the unbalanced trapping field can be generated using an RF voltage in a frequency range of between about 750 kHz and about 1500 kHz.

In various embodiments of the second aspect, transitioning can include ramping down time the AC voltage over less than about 1.5 ms and ramping up the RF voltage over between about 0.8 ms and about 2.5 ms.

In a third aspect, a mass selective ion trapping device can include a linear ion trap and an RF control circuitry. The linear ion trap can include a plurality of trap electrodes spaced apart from each other and surrounding a trap interior. The plurality of trap electrodes can include a first pair of trap electrodes and a second pair of trap electrodes. At least a first trap electrode of the first pair of trap electrodes can include a trap exit comprising an aperture. The trap electrodes can be configured to generate a quadrupolar trapping field in the trap interior and for mass selective ejection of ions from the trap interior. The RF control circuitry can be configured to generate a first quadrupolar trapping field having a near zero electric field on the centerline of the linear ion trap using a AC voltage during injection of ions; generate a second quadrupolar trapping field during ejection of ions from the trap using a RF voltage such that ions have a kinetic energy spread of less than about 5.0 eV before ejection from the linear ion trap; and transition between the AC voltage and the RF voltage by ramping down the AC voltage and ramping up the RF voltage after injection of the ions and before ejection of the ions.

In various embodiments of the third aspect, the RF voltage can be applied in an unbalanced mode such that an RF voltage applied to the second trap electrodes is greater than an RF voltage applied to the first trap electrodes.

In various embodiments of the third aspect, the RF voltage can be in a frequency range of between about 750 kHz and about 1500 kHz.

In various embodiments of the third aspect, the AC voltage can be applied in a balanced mode such that the first trap electrodes receive an AC voltage of equivalent magnitude but opposite sign to the AC voltage received by the second trap electrodes.

In various embodiments of the third aspect, the AC voltage can be in a frequency range of between about 100 kHz and about 600 kHz.

In various embodiments of the third aspect, the AC voltage can be less than about 400 $V_{0-P}$, such as less than about 200 $V_{0-P}$.

In various embodiments of the third aspect, during the transition period, a ramp down time for the AC voltage can be less than about 1.5 ms and a ramp up time for the RF voltage can be between about 0.8 ms and 2.5 ms.

BRIEF DESCRIPTION OF DRAWINGS

For a more complete understanding of the principles disclosed herein, and the advantages thereof, reference is now made to the following descriptions taken in conjunction with the accompanying drawings, in which.

Figure 1:
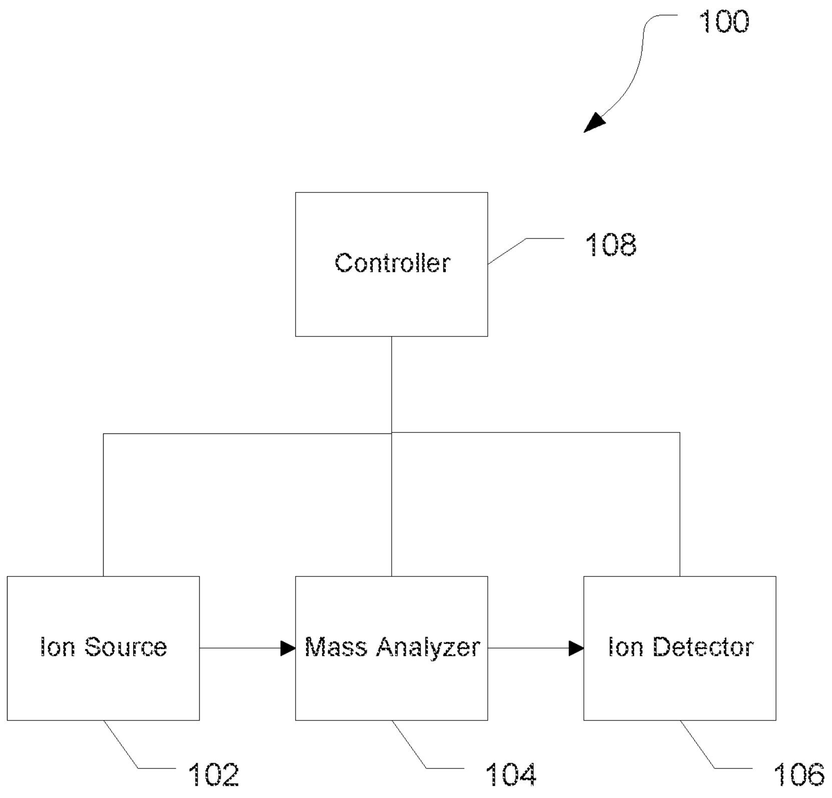
FIG. 1 is a block diagram of an exemplary mass spectrometry system, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for ion separation are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 104, an ion detector 106, and a controller 108.

In various embodiments, the ion source 102 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 104 can separate ions based on a mass-to-charge ratio of the ions. For example, the mass analyzer 104 can include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In various embodiments, the mass analyzer 104 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 106 can detect ions. For example, the ion detector 106 can include an electron multiplier, a Faraday cup, and the like. Ions leaving the mass analyzer can be detected by the ion detector. In various embodiments, the ion detector can be quantitative, such that an accurate count of the ions can be determined.

In various embodiments, the controller 108 can communicate with the ion source 102, the mass analyzer 104, and the ion detector 106. For example, the controller 108 can configure the ion source or enable/disable the ion source. Additionally, the controller 108 can configure the mass analyzer 104 to select a particular mass range to detect. Further, the controller 108 can adjust the sensitivity of the ion detector 106, such as by adjusting the gain. Additionally, the controller 108 can adjust the polarity of the ion detector 106 based on the polarity of the ions being detected. For example, the ion detector 106 can be configured to detect positive ions or be configured to detected negative ions.

Linear Ion Trap

Figure 2:
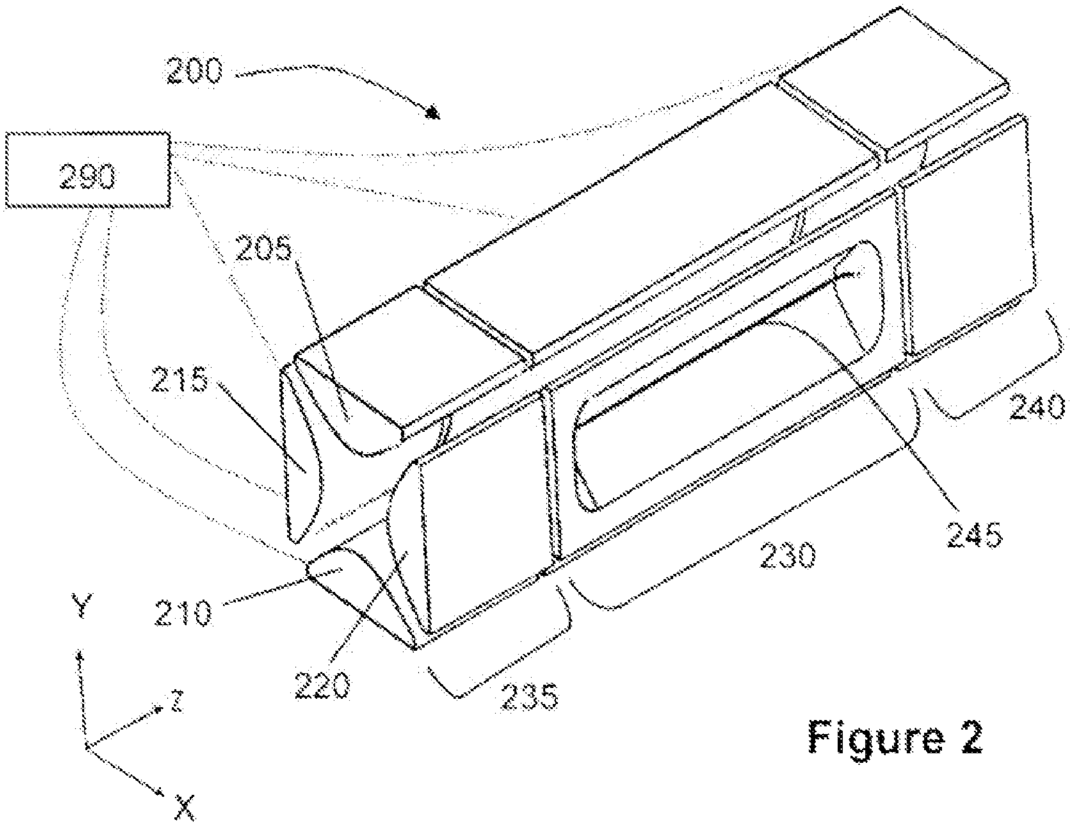
FIG. 2 is a perspective view illustrating the basic design of a two-dimensional linear ion trap, in accordance with various embodiments.

FIG. 2 illustrates a quadrupole electrode/rod structure of a linear or two-dimensional (2D) quadrupole ion trap 200. The quadrupole structure includes two sets of opposing electrodes including rods that define an elongated internal volume having a central axis along a z direction of a coordinate system. An X set of opposing electrodes includes rods 215 and 220 arranged along the x axis of the coordinate system, and a Y set of opposing electrodes includes rods 205 and 210 arranged along the y axis of the coordinate system. As illustrated, each of the rods 205, 210, 215, 220 is cut into a main or center section 230 and front and back sections 235, 240.

The ions are radially contained by the RF quadrupole trapping potentials applied to the X and Y electrode/rod sets under the control of a controller 290. A Radio Frequency (RF) voltage is applied to the rods with one phase applied to the X set, while the opposite phase is applied to the Y set. This establishes a RF quadrupole containment field in the x and y directions and will cause ions to be trapped in these directions.

To constrain ions axially (in the z direction), the controller 290 can be configured to apply or vary a DC voltage to the electrodes in the center segment 230 that is different from that in the front and back segments 235, 240. Thus a DC "potential well" is formed in the z direction in addition to the radial containment of the quadrupole field resulting in containment of ions in all three dimensions.

An aperture 245 is defined in at least one of the center sections 230 of one of the rods 205, 210, 215, 220. Through the aperture 245, the controller 290 can further facilitate trapped ions can be selectively expelled based on their mass-to-charge ratios in a direction orthogonal to the central axis by causing an additional AC dipolar electric field to be applied or varied in this direction. In this example, the apertures and the applied dipole electric field are on the X rod set. Other appropriate methods may be used to cause the ions to be expelled, for example, the ions may be ejected between the rods.

One method for obtaining a mass spectrum of the contained ions is to change the trapping parameters so that trapped ions of increasing values of mass-to-charge ratio become unstable. Effectively, the kinetic energies of the ions are excited in a manner that causes them to become unstable. These unstable ions develop trajectories that exceed the boundaries of the trapping structure and leave the quadrupolar field through an aperture or series of apertures in the electrode structure.

The sequentially expelled ions typically strike a dynode and secondary particles emanating therefrom are emitted to the subsequent elements of the detector arrangement. The placement and type of detector arrangement may vary, the detector arrangement for example extending along the length of the ion trap. Throughout this description, the dynode is considered to be part of the detector arrangement, the other elements being elements such as electron multipliers, pre-amplifiers, and other such devices.

It should be recognized that different arrangements for the mass analyzing system may be used, as is well known by the art. For example, analyzing device may be configured such that ions are expelled axially from the ion trap rather than radially. The available axial direction could be used to couple the linear ion trap to another mass analyzer such as a Fourier Transform RF Quadrupole Analyzer, Time of Flight Analyzer, three-dimensional ion trap, ORBITRAP Mass Analyzer or other type of mass analyzer in a hybrid configuration.

Combined balanced AC/unbalanced RF operation of the RF system can allow for optimized injection and ejection events. The ions are injected into the LIT in the balanced AC mode. This AC-supported injection does not require the resonance circuit. A transition event can be initiated with AC phasing out and unbalanced RF phasing in. The balanced AC can be ramped down and the unbalanced RF (high frequency) can be ramped up. The timing of both ramping events and AC/RF levels can be optimized to avoid ion losses during transition. After the AC is off, the ion trap can work in unbalanced RF mode until the ions are scanned-out. The combined mode can allow for near-optimum operation conditions both for ions' injection and ejection and can provide grounds for highly efficient usage of the LIT in DIA applications.

Figure 3:
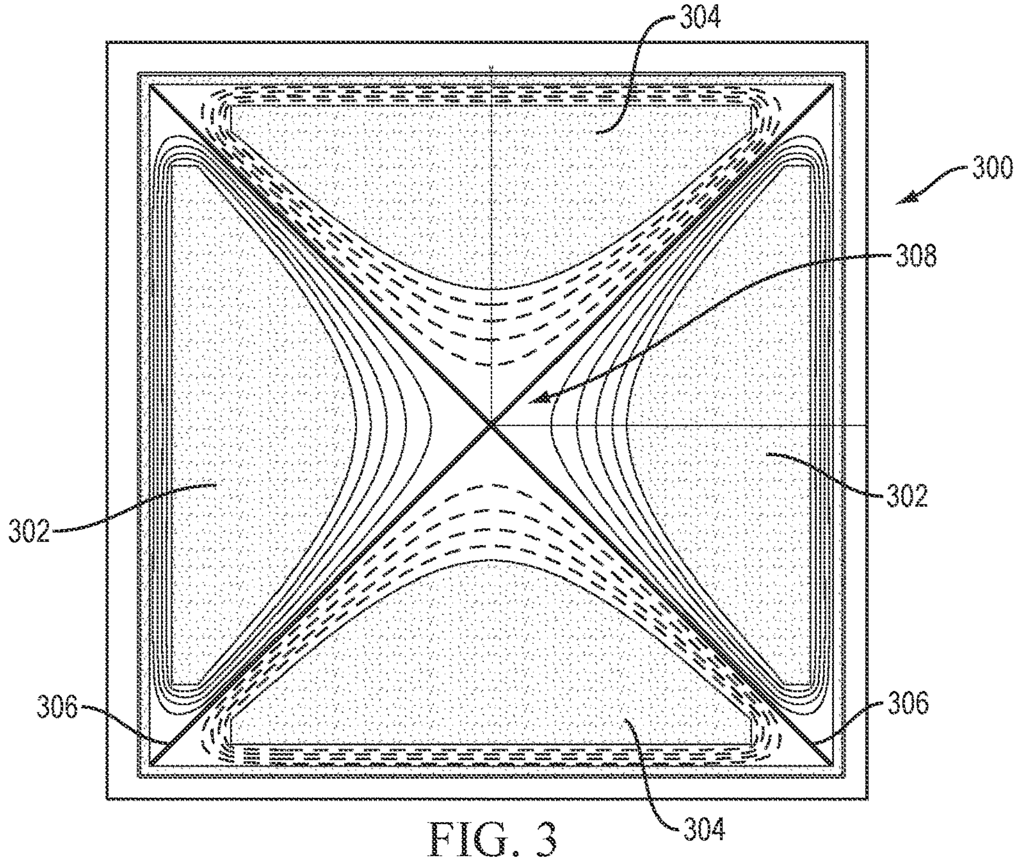
FIGS. 3, 4, and 5 illustrate the electrical fields in a linear ion trap, in accordance with various embodiments.

A well-balanced RF applied to opposite pairs of RF rods in the LIT can provide optimum conditions for ion trapping during injection. FIG. 3 illustrates the electrical field within an ion trap operated in a balanced mode. For illustrative purposes, the e-field is shown at the point in time where there is a positive 500V potential on the X electrodes 302 and a negative 500V potential on the Y electrodes 304. The potentials create a near zero e-potential at points equidistant between an X electrode 302 and a Y electrode 304, as shown by line 306. This creates a near-zero e-field region 308 near the centerline of the LIT that can be ideal for capturing and retaining of ions.

In DIA applications, ions can be scanned out from the LIT to be processed in post-ejection event. It can be important to contain the kinetic energy distribution (KED) in a narrow range. Preferably the KED width should be within tens of electron-volts or less. In normal LIT operation, the KED width can vary between hundreds and thousands of eV. Using an unbalanced RF mode for ion ejection can improve the KED by removing the negative effect of post ejection KE modulation by an RF voltage applied to the slotted RF rod (X electrode) the ion pass through. However, the unbalanced RF mode is inferior for ion injection because of non-zero e-field on the centerline of ion injection.

Figure 4:
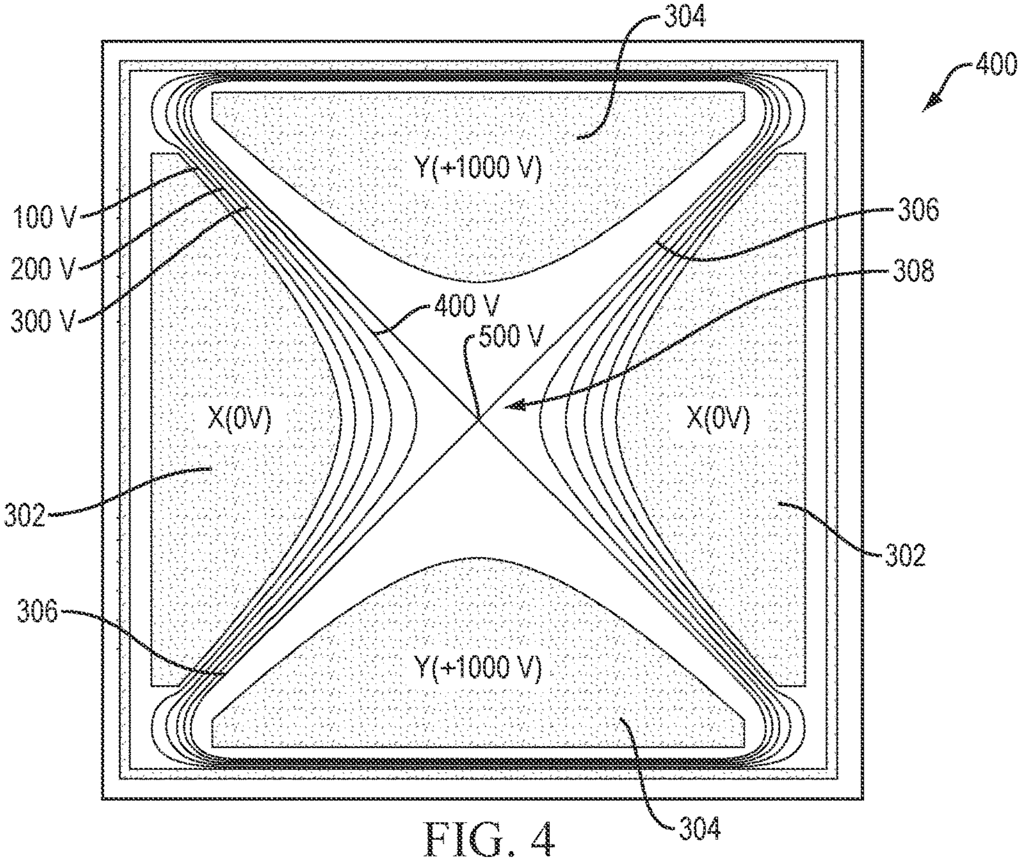
Figure 5:
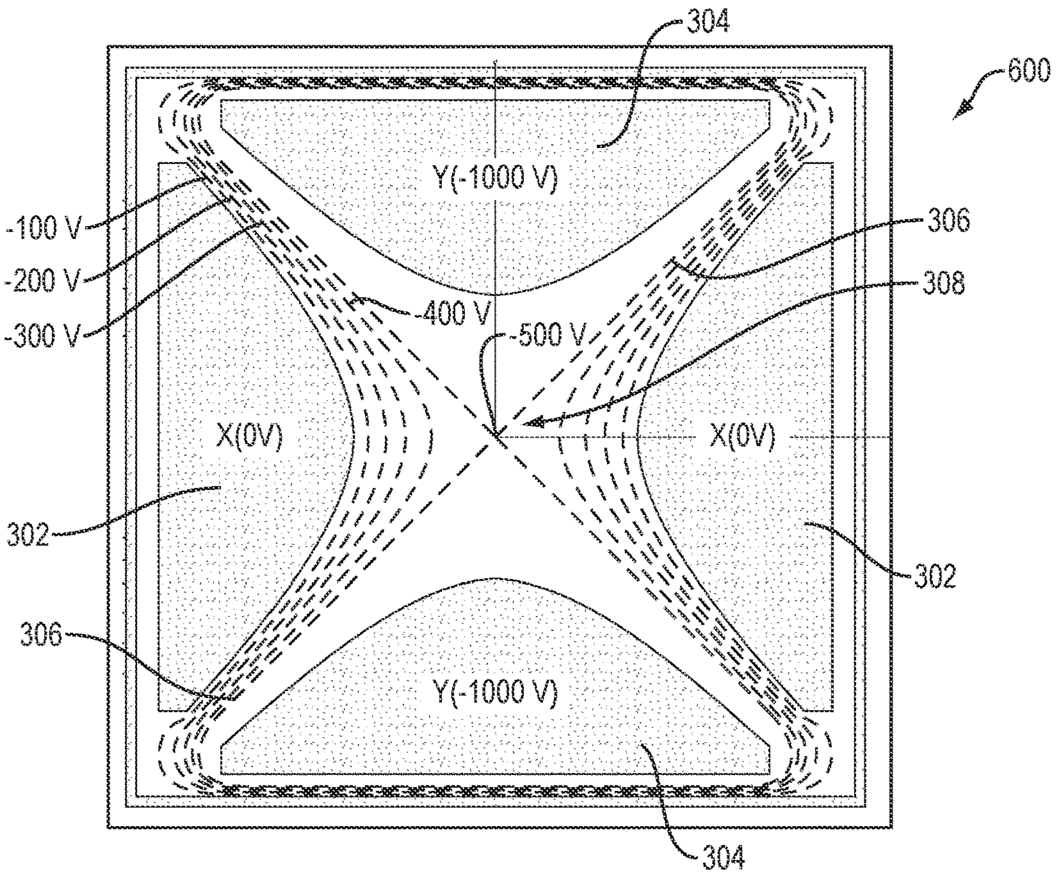

FIGS. 4 and 5 illustrate the electrical field within an ion trap operated in an unbalanced mode. In unbalanced mode, the same difference between the Y electrodes 304 and the X electrodes 302 can be required to maintain the trapping potential within the LIT. However, the X electrodes 302 are held at a near 0V potential while the RF is applied entirely to the Y electrodes 304. For illustrative purposes, FIG. 4 shows the e-field at the point in time where there is a positive 1000V potential on the Y electrodes 304, while FIG. 5 shows the e-field at a point in time where there is a negative 1000V potential on the Y electrodes 304. The potentials create a significant e-field (approximately half the voltage applied to the Y electrodes 304) at points equidistant between an X electrode 302 and a Y electrode 304, as shown by line 306. The region 308 near the centerline of the LIT can experience drastic swings in the potential from a positive 500V in FIG. 4 to a negative 500V in FIG. 5. Such significant variability in the centerline potential can make it difficult to efficiently trap incoming ions. However, once inside the LIT, ions are effected primarily by the difference between the X electrodes 302 and the Y electrodes 304 rather than the absolute magnitude of the centerline.

Figure 6:
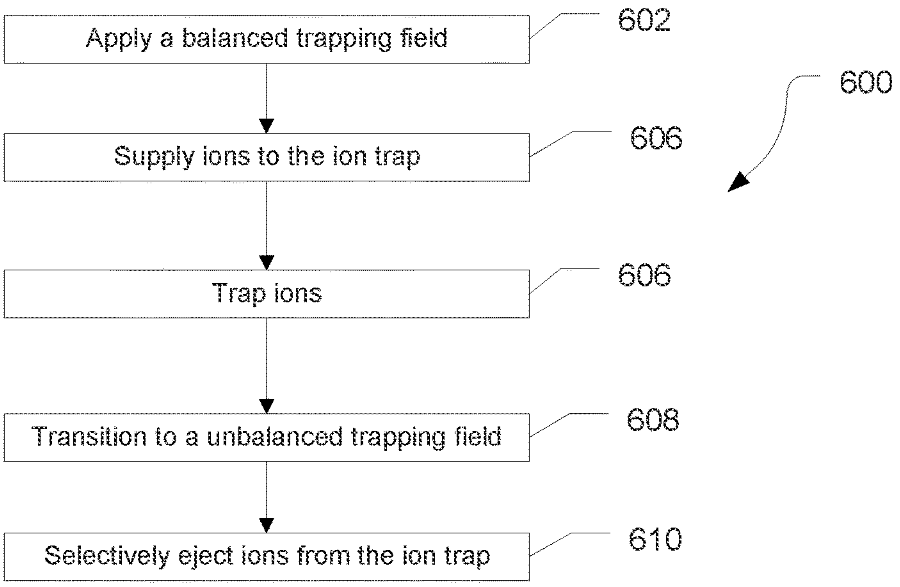
FIG. 6 is a flow diagram illustrating an exemplary method for operating a linear ion trap, in accordance with various embodiments.

Combining balanced AC mode operation during ion injection into the LIT and unbalanced RF mode operation for ion ejection can provide optimal trapping during injection and minimal KED during ejection. FIG. 6 illustrates a method for operating the LIT. At 602, a balanced trapping field can be applied, and at 604, ions can be supplied to the ion trap. At 606, the ions can be trapped within the ion trap. At 608, the ion trap can transition to an unbalanced trapping field, and, after the transition is complete, the ions can be selectively ejected from the ion trap while an unbalanced trapping field is applied. In various embodiments, the ions can be selectively ejected from the ion trap using an excitation waveform that is targeted to ions having a particular mass-to-charge ratio.

Figure 7:
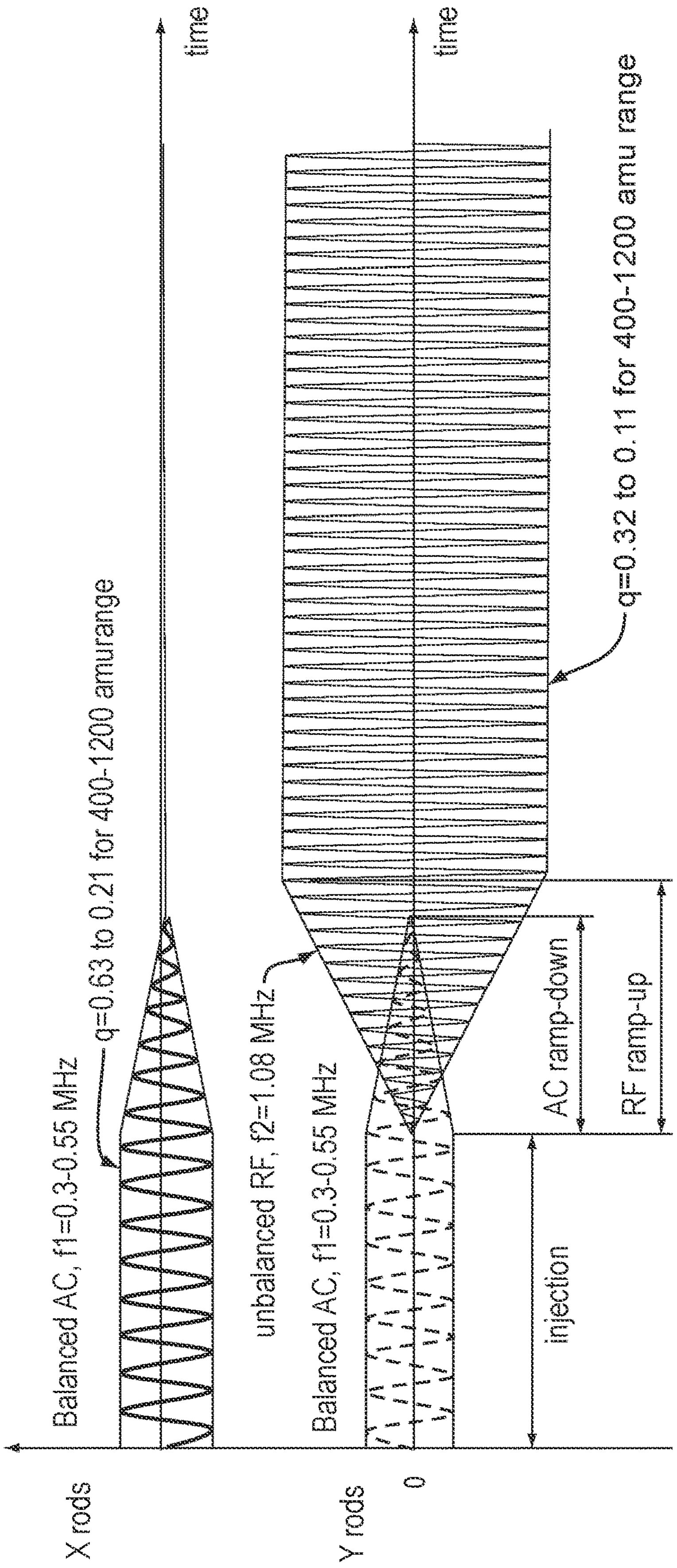
FIG. 7 is a timing diagram illustrating an exemplary voltage scheme applied to a linear ion trap, in accordance with various embodiments.

FIG. 7 is a timing diagram illustrating the potentials applied to the electrodes on the LIT. During injection, the LIT is operated in balanced mode with an AC frequency waveform applied to both the X and Y electrodes. The AC frequency waveform applied to the Y electrodes is phase shifted 180 degree from the AC frequency waveform applied to the X electrodes. In various embodiments, the AC voltage can be in a frequency range of between about 100 kHz and about 600 kHz, such as between about 200 kHz and about 300 kHz. In other embodiments, the AC voltage can be in frequency range of between about 300 kHz and about 400 kHz or between about 400 kHz and about 500 kHz or between about 500 kHz and about 600 kHz. In various embodiments, the AC voltage can be less than about 400 $V_{0-P}$, such as less than about 200 $V_{0-P}$. Once injection is complete, the LIT transitions from balanced mode to unbalanced mode. The AC frequency waveform is ramped down while an RF frequency waveform is ramped up on the Y electrodes. In various embodiments, the RF voltage can be in a frequency range of between about 750 kHz and about 1500 kHz. The unbalanced mode can be maintained while cooling the ions to reduce their kinetic energy and while ejecting ions. In various embodiments, the ions can be cooled such that the kinetic energy spread of ions before ejection from the linear ion trap can be less than about 5.0 eV, such as less than about 2.5 eV, such as less than about 0.5 eV, even less than about 0.2 eV.

In various embodiments, the AC frequency waveform can be applied an analog waveform, such as a sine wave. Alternatively, the AC frequency waveform can be applied as a digital waveform of the same frequency and amplitude.

The LIT can be switched back to balanced mode prior to the next injection (not shown). However, since trapping of ions is not important when switching back to balanced mode, there is no need to ramp the waveforms and the transition can be relatively abrupt by turning the RF frequency waveform off and turning the AC frequency waveform on.

Use of balanced AC for ion injection instead of balanced RF has additional benefits. An AC frequency used for the injection event can be significantly lower than RF frequency required for analytical operation of the LIT in ion isolation and scan-out event. This can reduce the need for a second resonance-based system to provide RF frequency potentials to the X electrodes. Instead the trapping AC can be applied in a non-resonant mode.

The efficiency of ion injection can be controlled by choosing optimal range of q factors. Its value is proportional to RF voltage on rods and inversely proportional to m/z and square of frequency. Dropping the frequency by a factor of 2-5 allows a reduction in voltage on electrodes by a factor of 4-25 keeping the value of q-factor. That frequency range is typically referred to as the AC range. Operating with AC voltages on electrodes at or below 400 $V_{0-P}$, such as less than about 200 $V_{0-P}$, allows for usage of non-resonant circuits to generate the AC. This, in turn, can give good control on turning on, linear ramp and switching off the AC independent of RF circuit operation. There can be a lower total dissipated RF power as well.

To successfully transition from balanced mode to unbalanced mode while maintaining the ions in the LIT requires ramping down the AC synchronously with ramping up the RF voltage keeping the total e-field strong enough to retain ions but not too strong to eject ions. These two ramps start together but their time lengths may be different. In various embodiments, a ramp down time for the AC voltage can be less than about 1.5 ms and a ramp up time for the RF voltage can be between about 0.8 ms and about 2.5 ms.

Figure 8:
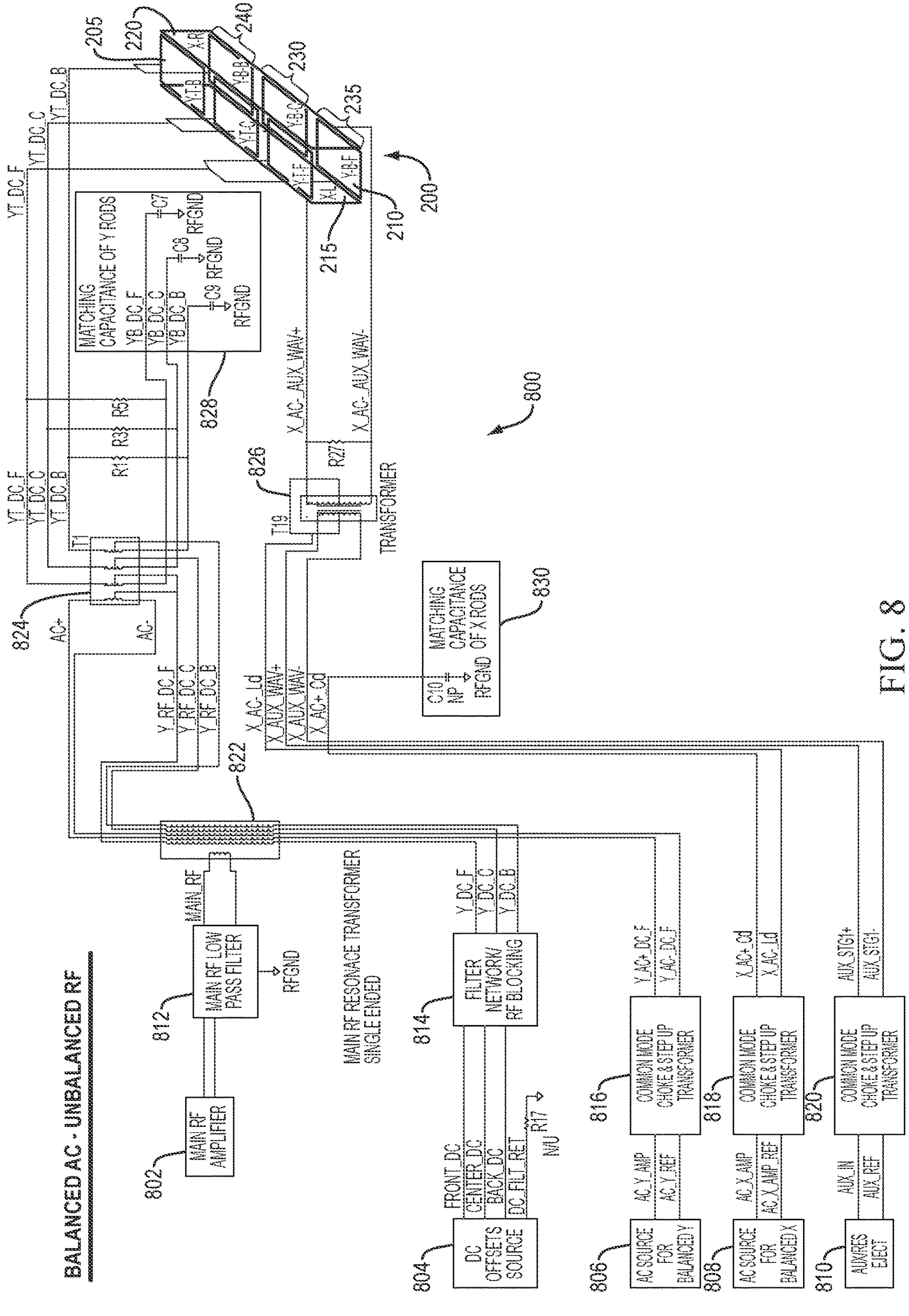
FIG. 8 is a diagram illustrating an exemplary voltage supply circuitry, in accordance with various embodiments.

FIG. 8 is an electrical diagram of an exemplary voltage supply 800 to supply the necessary voltages to ion trap 200. The voltage supply 800 can include RF amplifier 802, DC offset source 804, AC source 806, AC source 808, and auxiliary supply 810.

DC offset source 804 can provide a DC offset on the Y rods between the front 235, center 230, and back 240 portions of the ion trap 200. In various embodiments, it can be desirable to have an elevated DC voltage for the front 235 and back 240 portions and a relatively lower DC voltage for the center 230 portion to create a well to trap ions in the z direction.

During balanced mode operation, AC source 806 can provide the AC voltage to the Y rods 205 and 210 and AC Source 808 can provide the AC voltage to the x rods 215 and 220.

During unbalanced mode operation, main RF amplified 802 can provide the RF voltage to Y rods 205 and 210.

During ejection, auxiliary supply 810 can provide the excitation waveform to the X rods 215 and 220 to selectively eject ions from the trap.

Voltage supply 800 can further include low pass filter 812 to reduce noise on the main RF circuit, filter 814 to block RF on the DC offset circuit, and filter choke and step-up transformers 816, 818, and 820 to reduce noise and increase the voltage of the balanced AC circuits and the auxiliary circuit.

Voltage supply 800 can further include transformers 822, 824, and 826 to couple the sources to ion trap 200. Transformer 824 couples AC supply 806 to the front 235, center 230, and back 240 sections of Y rods 205 and 210. Transformer 822 couples the RF amplifier 802 to lines from the DC offset source 804 and AC source 806. Transformer 826 couples AC source 808 and auxiliary source 820 to the X rods 215 and 220.

Voltage supply 800 also includes capacitors 828 and 830 so the capacitance of each circuit can be matched.

Computer-Implemented System

Figure 9:
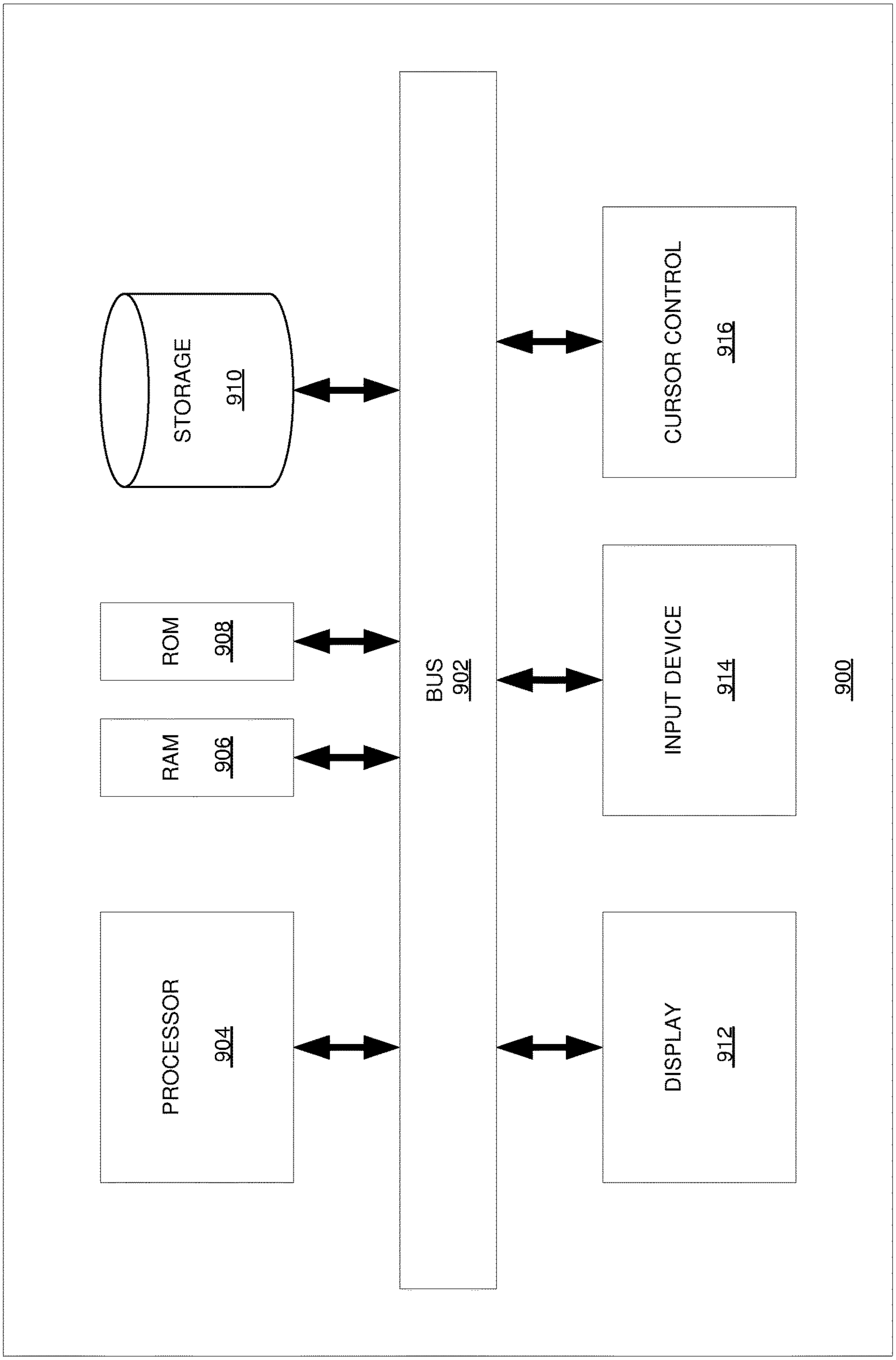
FIG. 9 is a block diagram illustrating an exemplary data analysis system, in accordance with various embodiments.

FIG. 9 is a block diagram that illustrates a computer system 900, upon which embodiments of the present teachings may be implemented as which may incorporate or communicate with a system controller, for example controller 110 shown in FIG. 1, such that the operation of components of the associated mass spectrometer may be adjusted in accordance with calculations or determinations made by computer system 900. In various embodiments, computer system 900 can include a bus 902 or other communication mechanism for communicating information, and a processor 904 coupled with bus 902 for processing information. In various embodiments, computer system 900 can also include a memory 906, which can be a random access memory (RAM) or other dynamic storage device, coupled to bus 902, and instructions to be executed by processor 904. Memory 906 also can be used for storing temporary variables or other intermediate information during execution of instructions to be executed by processor 904. In various embodiments, computer system 900 can further include a read only memory (ROM) 908 or other static storage device coupled to bus 902 for storing static information and instructions for processor 904. A storage device 910, such as a magnetic disk or optical disk, can be provided and coupled to bus 902 for storing information and instructions.

In various embodiments, computer system 900 can be coupled via bus 902 to a display 912, such as a cathode ray tube (CRT) or liquid crystal display (LCD), for displaying information to a computer user. An input device 914, including alphanumeric and other keys, can be coupled to bus 902 for communicating information and command selections to processor 904. Another type of user input device is a cursor control 916, such as a mouse, a trackball or cursor direction keys for communicating direction information and command selections to processor 904 and for controlling cursor movement on display 912. This input device typically has two degrees of freedom in two axes, a first axis (i.e., x) and a second axis (i.e., y), that allows the device to specify positions in a plane.

A computer system 900 can perform the present teachings. Consistent with certain implementations of the present teachings, results can be provided by computer system 900 in response to processor 904 executing one or more sequences of one or more instructions contained in memory 906. Such instructions can be read into memory 906 from another computer-readable medium, such as storage device 910. Execution of the sequences of instructions contained in memory 906 can cause processor 904 to perform the processes described herein. In various embodiments, instructions in the memory can sequence the use of various combinations of logic gates available within the processor to perform the processes describe herein. Alternatively hard-wired circuitry can be used in place of or in combination with software instructions to implement the present teachings. In various embodiments, the hard-wired circuitry can include the necessary logic gates, operated in the necessary sequence to perform the processes described herein. Thus, implementations of the present teachings are not limited to any specific combination of hardware circuitry and software.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

Results

Figure 10A:
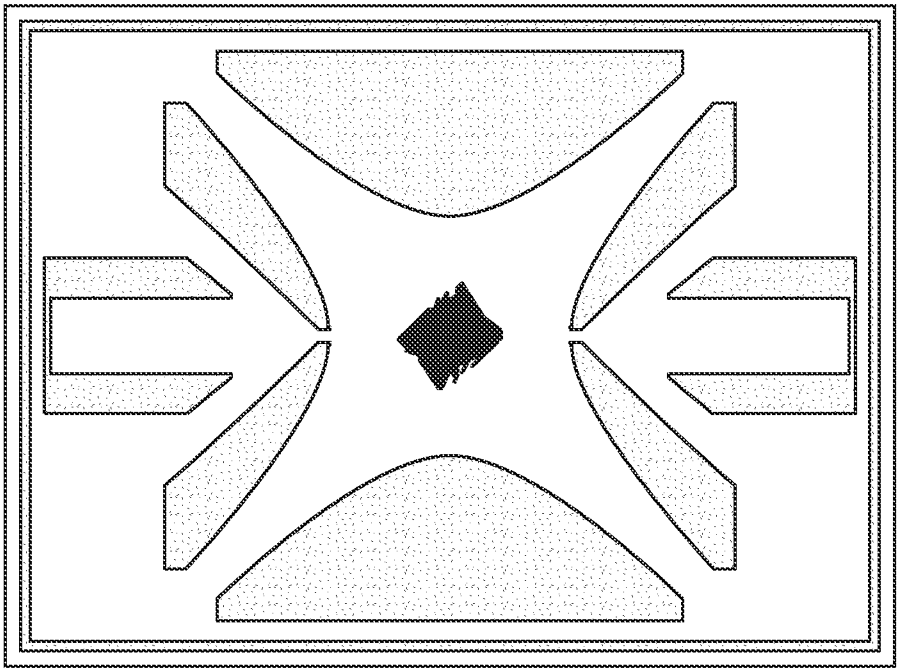
FIGS. 10A, 10B, 11A, 11B, 12A, 12B, 13A, 13B, 14A, 14B, 15A, 15B are graphics illustrating simulation results of ions after transitioning from balanced mode to unbalance mode and after cooling.
Figure 10B:
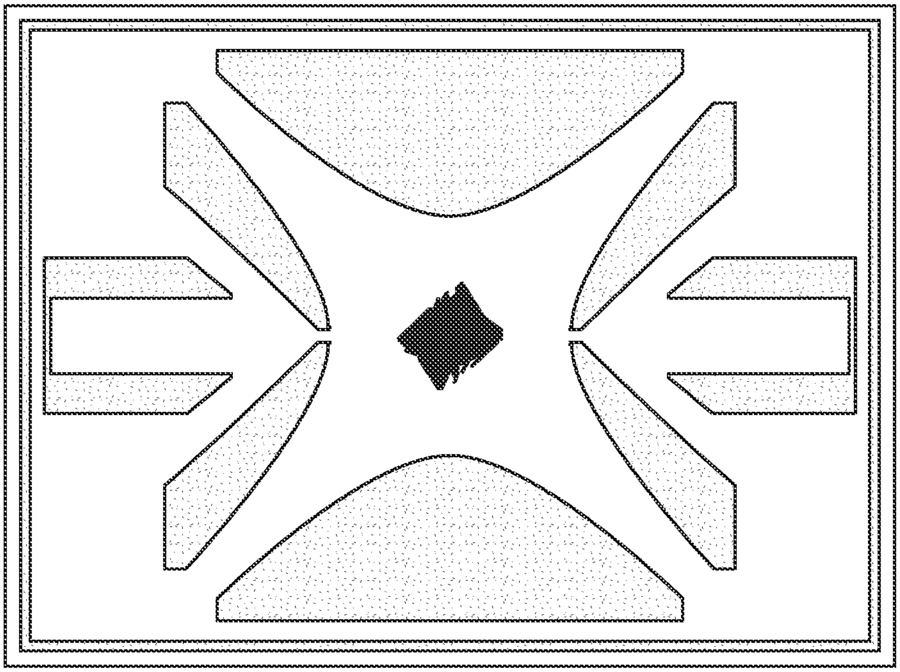
Figure 11A:
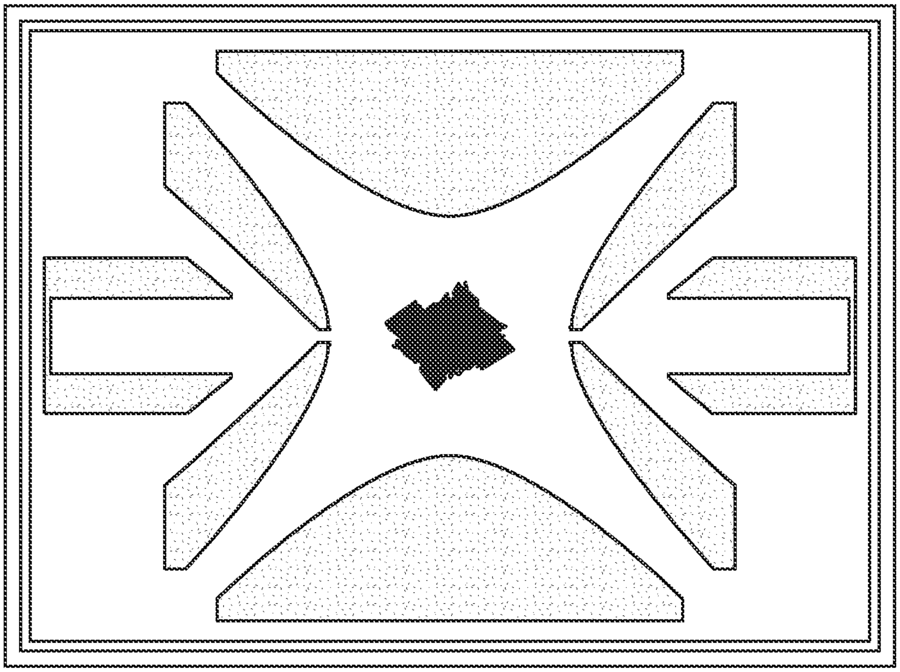
Figure 11B:
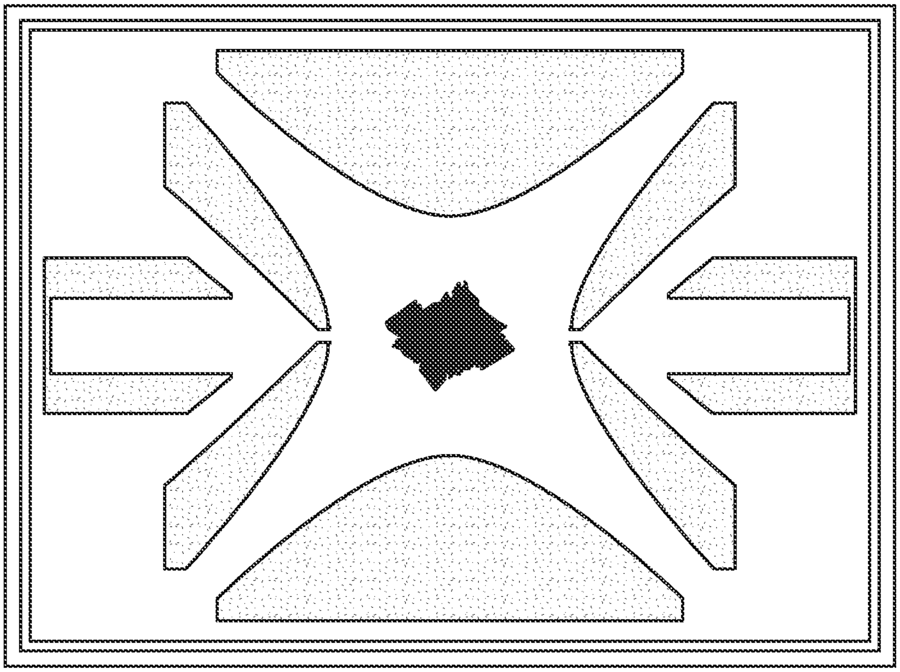
Figure 12A:
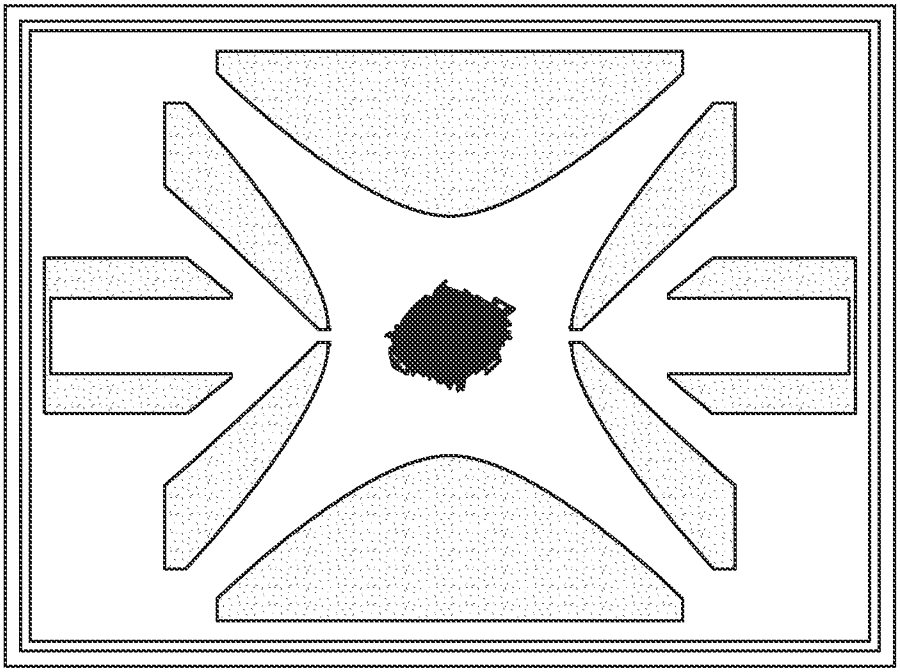
Figure 12B:
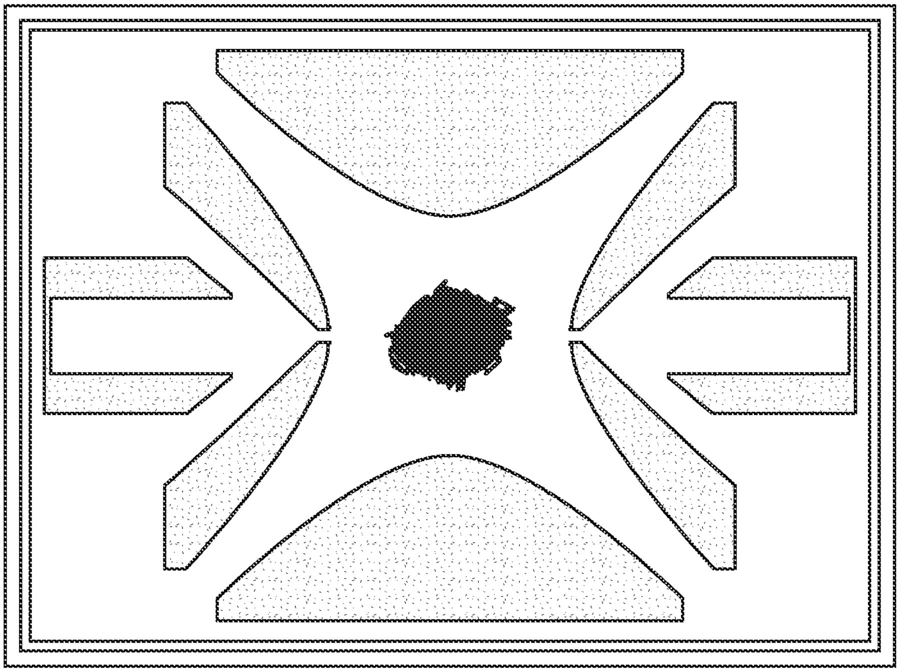
Figure 13A:
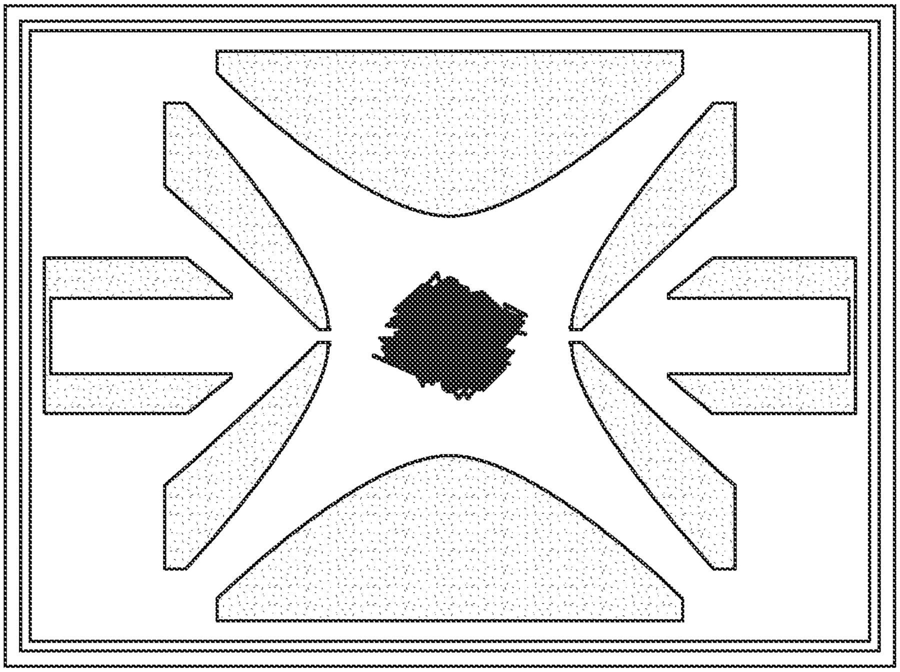
Figure 13B:
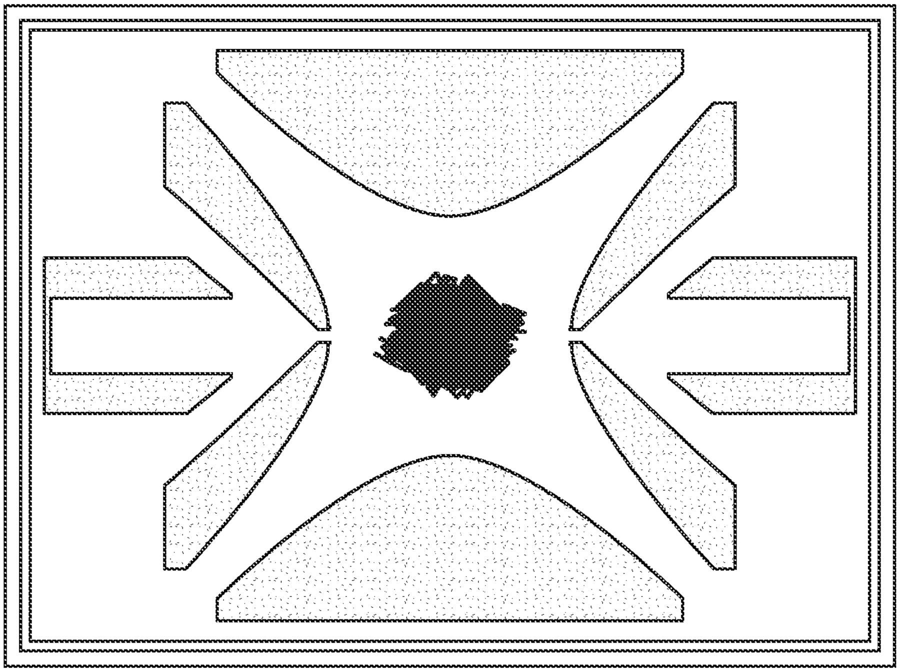
Figure 14A:
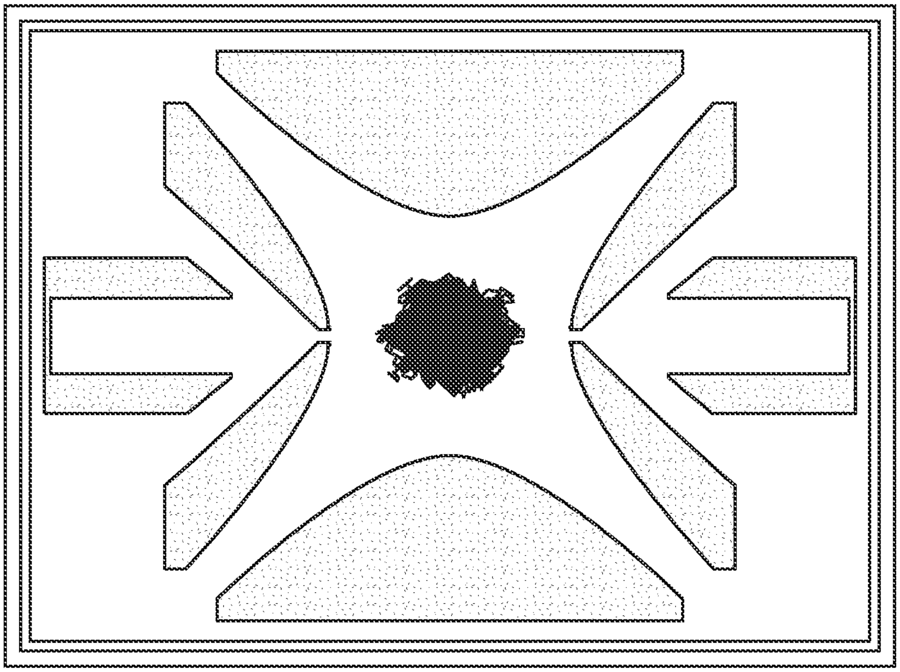
Figure 14B:
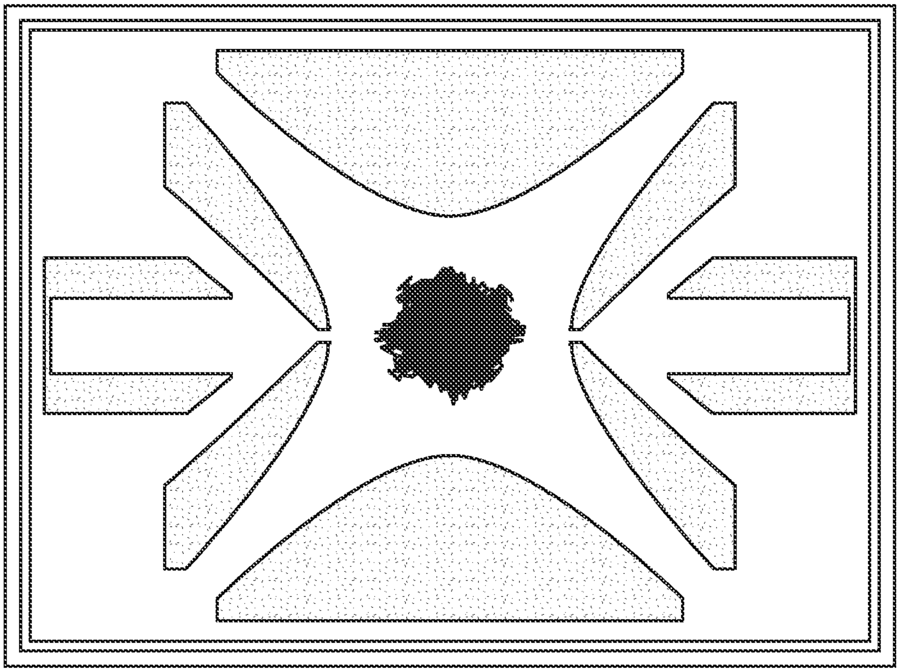
Figure 15A:
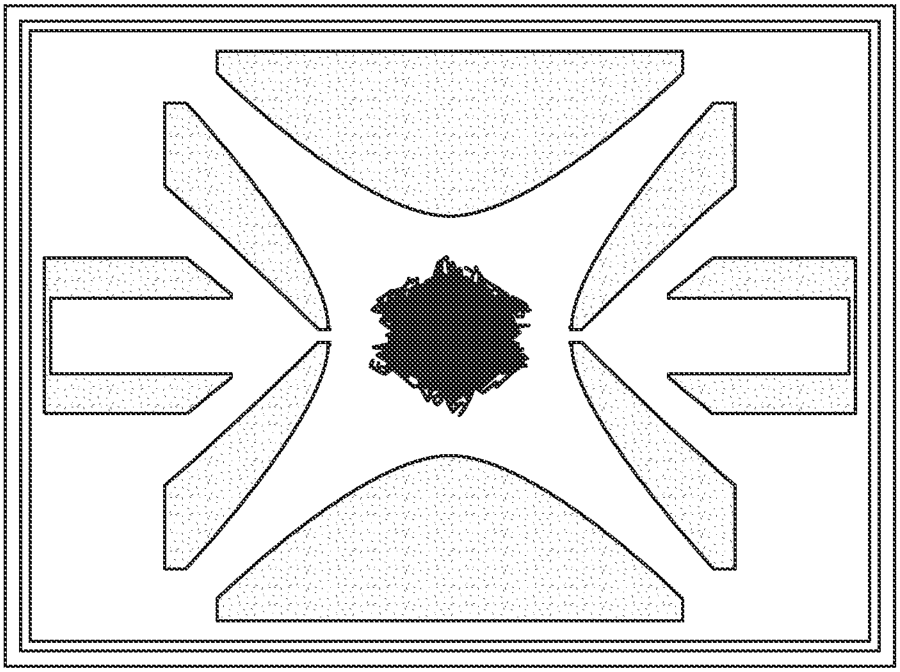
Figure 15B:
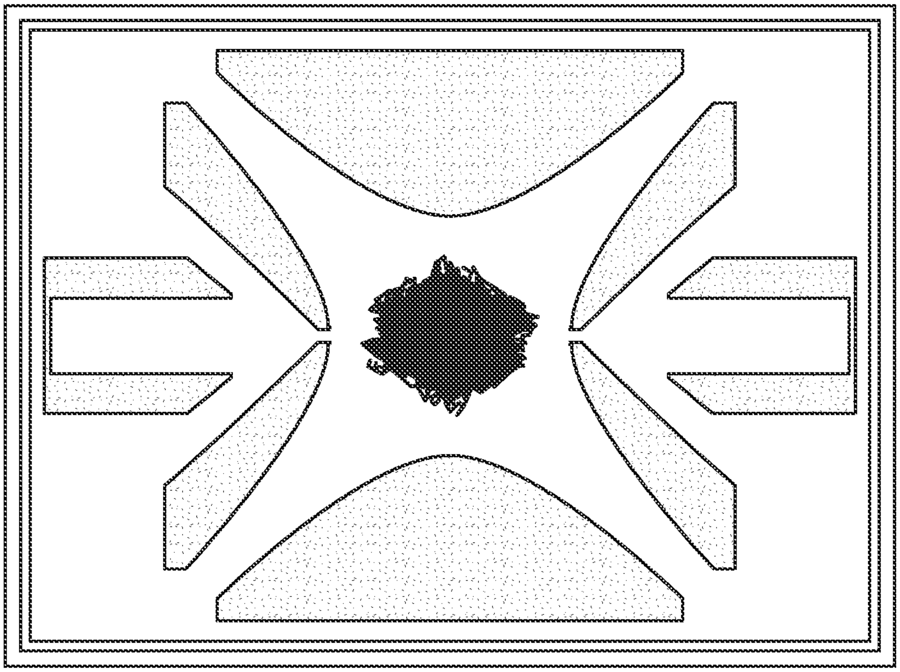

Typical mass range of precursor ions in bottom-up Proteomics can be 400-850 amu. A more extended range can be 400-1200 amu. FIGS. 10A, 10B, 11A, 111B, 12A, 12B, 13A, 13B, 14A, 14B, 15A, and 15B show x-y the simulation results (SIMION) on efficiency of ion trapping after injection of various size ions within the range of 400-1200 amu. The timing is as follows: injection for 500 us, transition period when AC is ramped down for 500 us and RF is ramped up 1200 us. At the end of ramp-up event, RF remained constant. Total time with the final cool-down event—2500 us. AC frequencies are 160 kHz. The corresponding AC voltages were calculated based on injection q for ion masses of interest. RF frequency was kept at 1.1 MHz in all simulations. FIGS. 10A and 10B show the results for ions of 400 amu. FIGS. 11A and 11B show the results for ions of 550 amu. FIGS. 12A and 12B show the results for ions of 700 amu. FIGS. 13A and 13B show the results for ions of 850 amu. FIGS. 14A and 14B show the results for ions of 1000 amu. FIGS. 15A and 15B show the results for ions of 1200 amu.

Figure 16:
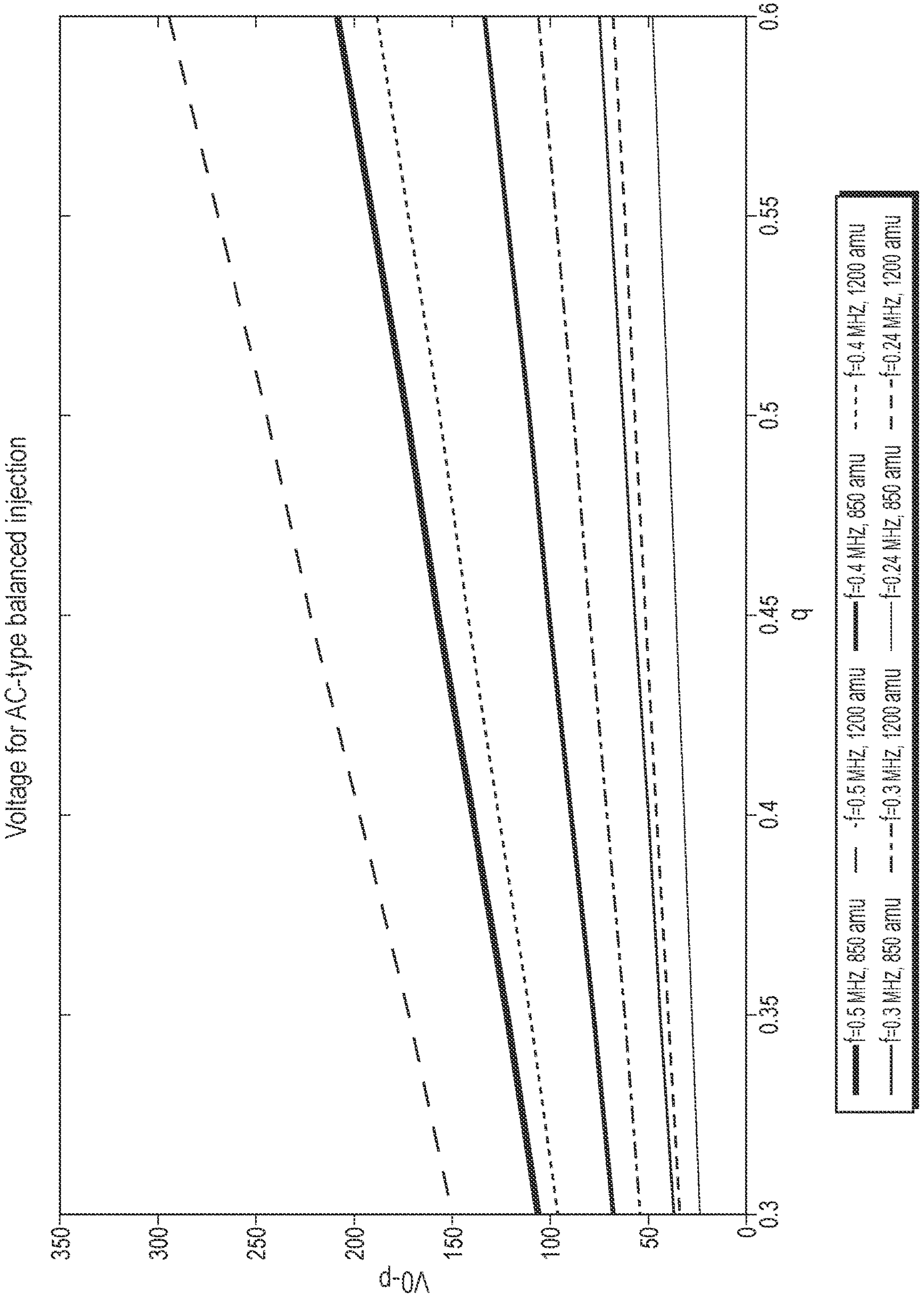
FIG. 16 is a graph illustrating the voltage needed in balanced mode as a function of q and ion mass.

One of practical considerations is available AC voltage for balanced AC for a frequency range 100-600 kHz. FIG. 16 is a graph of the voltage ($V_{0\text{-}p}$) needed for trapping ions using a balanced AC waveform. 110 $V_{0\text{-}p}$ is used as a benchmark based on the available AC voltage on commercially available mass spectrometer systems with a LIT. A supplementary AC system capable of providing 110 $V_{0\text{-}p}$ can work across the mass range 400-850 amu at frequencies up to 300 kHz, q from 0.3 to 0.6. For the extended mass range (up to 1200 amu) the upper q value would be ~0.55 at frequency 300 kHz. For higher frequency, 0.4 MHz, the normal mass range up to 850 amu allows operating at q up to 0.45 and for the extended mass range q limit will be 0.3. Alternatively, increasing the available AC voltage could achieve a broader operating range. For example, at 200 $V_{0\text{-}p}$, the normal mass range up to 850 amu allows operating at q up to 0.55 and for the extended mass range q limit will be 0.4 at frequencies of up to 500 kHz. At 400 $V_{0\text{-}p}$, the extended mass range allows operating at a q limit above 0.6 at frequencies of up to 500 kHz.

Figure 17:
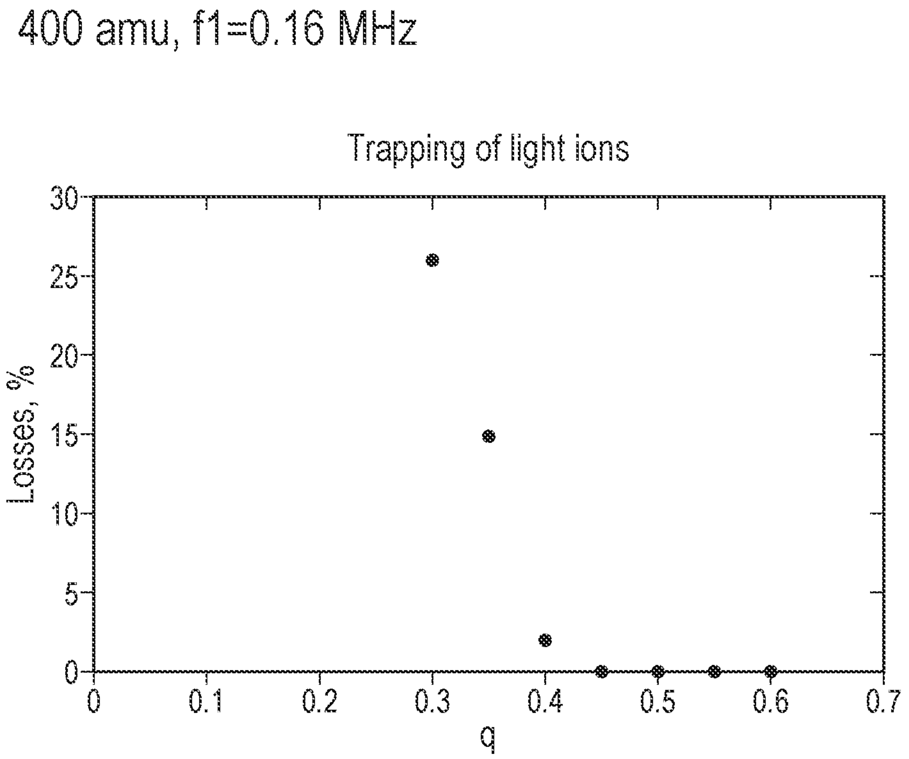
FIG. 17 is a graph illustrating ion losses for low mass ions (400 amu) as a function of q.
Figure 18A:
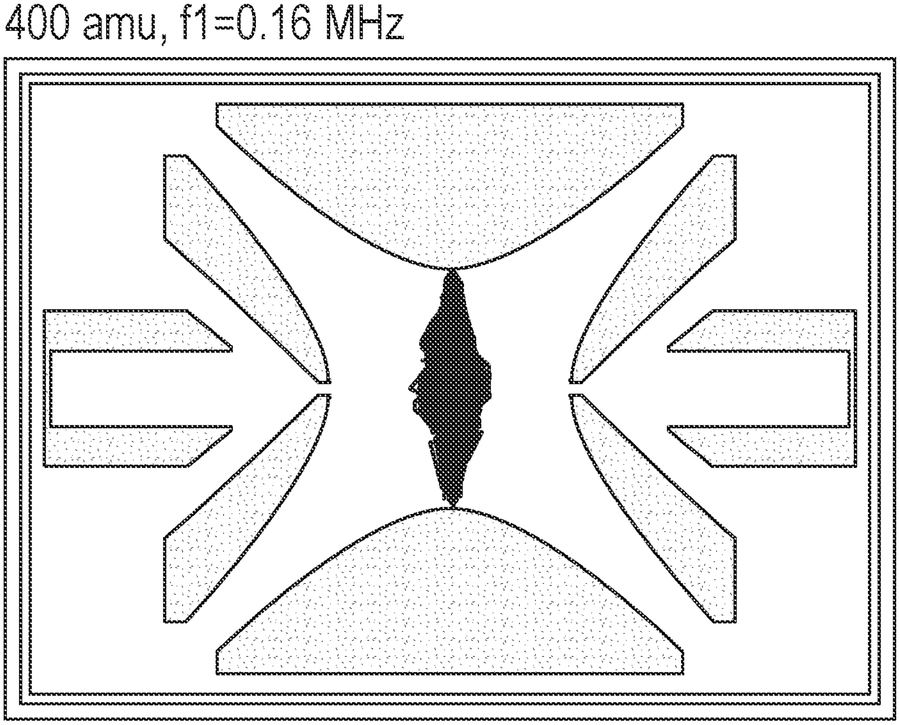
FIGS. 18A, 18B, 19A, and 19B are graphics illustrating simulation results showing ion containment during injection at various frequencies of the balanced AC voltage.
Figure 18B:
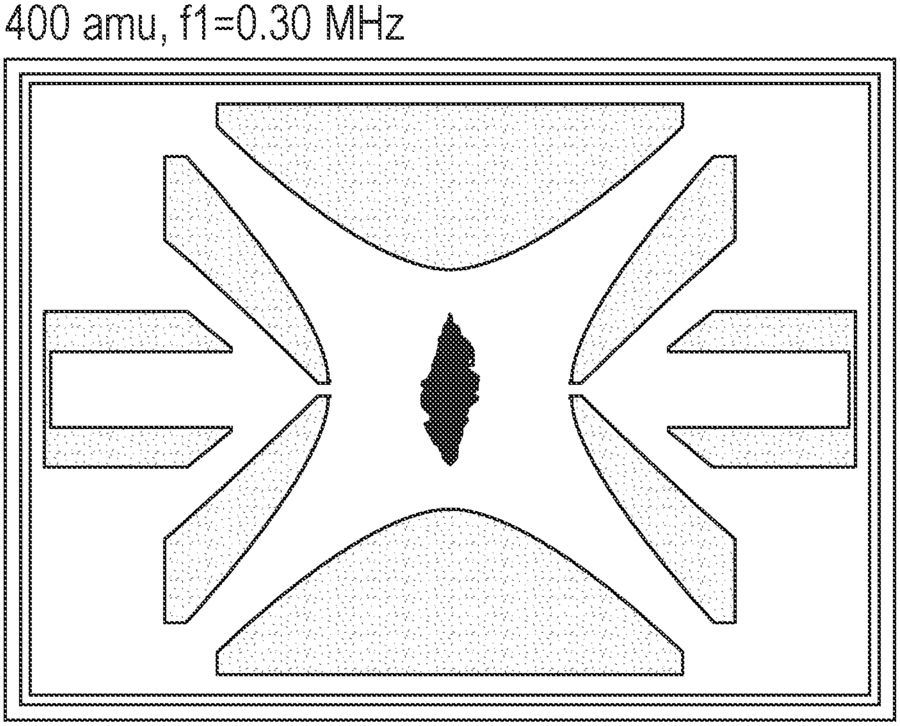
Figure 19A:
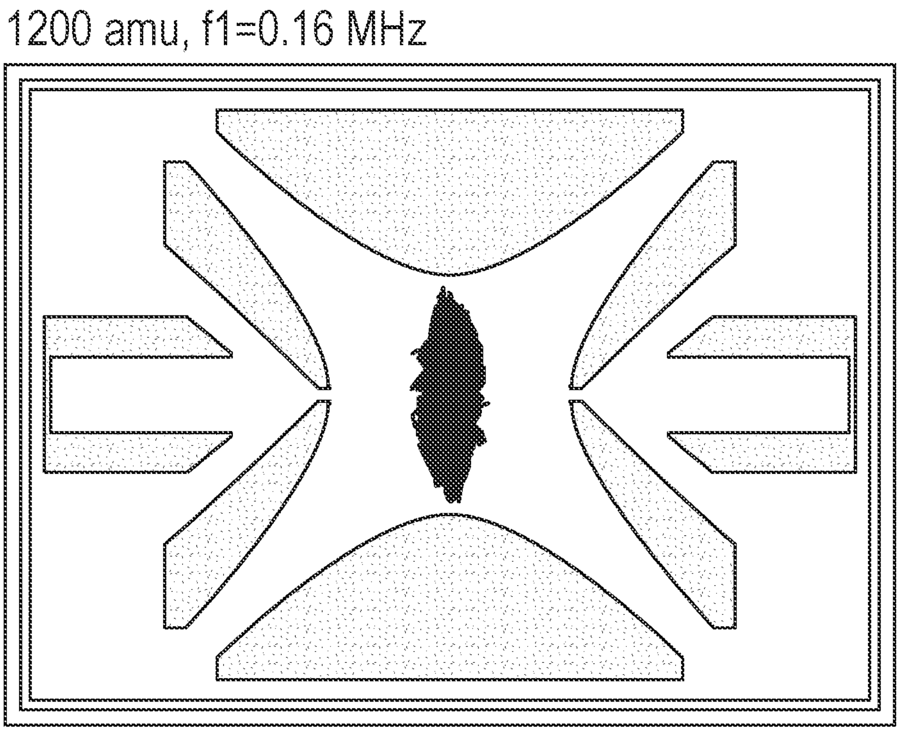
Figure 19B:
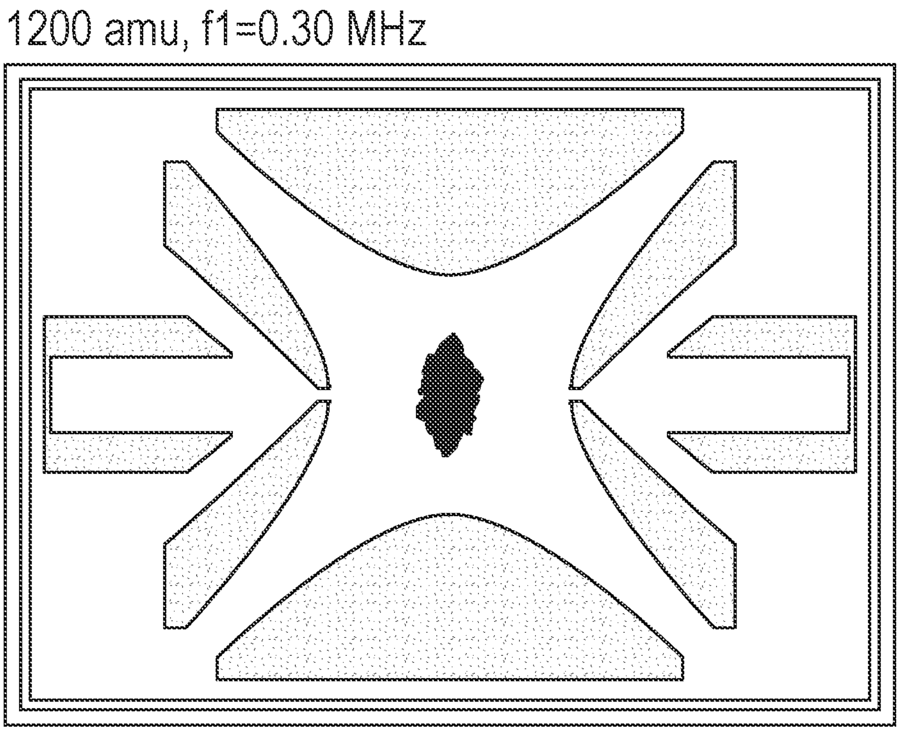

FIG. 17 illustrates the trapping efficiency at the low end of the mass range (400 amu) at a frequency of 0.16 Mhz. Below a q of about 0.4, there can be significant losses of low mass ions, with almost no loss occurring at q greater than about 0.45.

Benefits of increasing the AC frequency is clear from FIGS. 18A, 18B, 19A, and 19C. Both 400 amu and 1200 amu ions are much better contained to the center of the trap when higher frequency (0.3 or 0.24 MHz) is used during injection vs. at low frequencies (0.16 or 0.2 MHz). This reduces cooling time before ejection. That time factor can be important for high-throughput applications.

What is claimed is:

1. A method for identifying components of a sample comprising:

supplying ions to a mass selective linear ion trap, the ion trap including a plurality of trap electrodes spaced apart from each other and surrounding a trap interior, the trap electrodes configured for generating a quadrupolar trapping field in the trap interior;

trapping the ions within a balanced trapping field, the balanced trapping field generated by applying AC voltages to the plurality of trap electrodes such that a first pair of trap electrodes receive an AC voltage of equivalent magnitude but opposite sign to an AC voltage received by a second pair of trap electrodes;

transitioning between a balanced trapping field to an unbalanced trapping field, the unbalanced trapping field generated by applying RF voltages to the plurality of trap electrodes such that a magnitude of the RF voltage applied to the first pair of trap electrodes is different from a magnitude of the RF voltage applied to the second pair of trap electrodes, wherein transitioning includes ramping down the AC voltages over less than about 1.5 ms and ramping up the RF voltages over between about 0.8 ms and about 2.5 ms; and maintaining the unbalanced trapping field while selectively ejecting ions from the trap interior based on their mass using an auxiliary RF voltage.

2. The method of claim 1 wherein a kinetic energy spread of ions before ejection from the linear ion trap is less than about 5.0 eV.

3. The method of claim 1 wherein an electric field on a centerline of the linear ion trap is near zero when trapping the ions within the balanced trapping field.

4. The method of claim 1 wherein the balanced trapping field is generated using an AC voltage in a frequency range of between about 100 kHz and about 600 kHz.

5. The method of claim 1 wherein the balanced trapping field is generated using an AC voltage of less than about $400V_{0\text{-}P}$.

6. The method of claim 4 wherein the balanced trapping field is generated using an AC voltage of less than about $200V_{0\text{-}P}$.

7. The method of claim 1 wherein the balanced trapping field is generated using a digital waveform.

8. The method of claim 1 wherein the unbalanced trapping field is generated using an RF voltage in a frequency range of between about 750 kHz and about 1500 kHz.

* * * * *